March 27, 1928. 1,663,612
A. E. REID
UNIVERSAL JOINT FOR PISTONS
Filed April 8, 1926
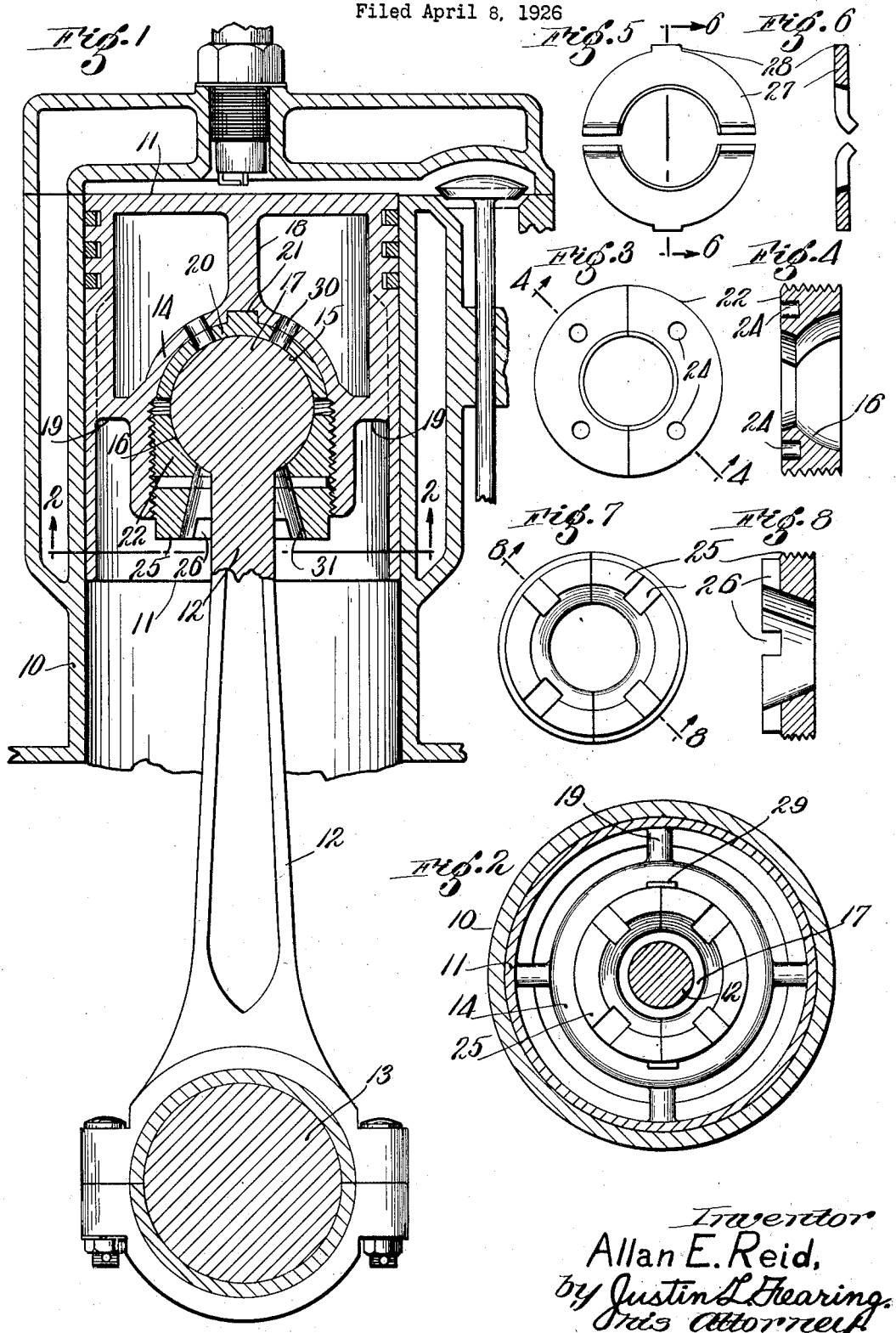
Inventor
Allan E. Reid,
by Justin L. Hearing.
His Attorney Patented Mar. 27, 1928.

1,663,612

UNITED STATES PATENT OFFICE.

ALLAN E. REED, OF BOSTON, MASSACHUSETTS.

UNIVERSAL JOINT FOR PISTONS.

Application filed April 8, 1926. Serial No. 100,544.

This invention relates to internal combustion engines of the reciprocating piston type, and more particularly to the coupling of the piston to the connecting rod.

Heretofore, it has been the usual practice to employ a wrist pin for coupling the connecting rod and piston of an internal combustion engine. Various difficulties are encountered in the construction and operation of engines in which wrist pins are employed. Among these are: lack of alignment between the axis of an engine cylinder and a radius of the crank shaft to which the piston is connected by the connecting rod; scoring of the cylinder walls by the piston; excessive vibration of the piston, connecting rod and associated parts; impulsive vibration of the engine parts in the form of "piston slap", and "wrist pin knock"; and various other difficulties with which automotive engineers and repair men are familiar.

When a wrist pin is employed to couple the piston to the connecting rod, any rough spot or projection in either the piston or the cylinder repeatedly traces the same path and thus tends to produce scoring of the surface upon which it slides, so that in time serious wear and interference with smooth operation usually results.

In order to provide suitable bearings for the connecting rod in relation to a wrist pin and piston it is a common practice to provide considerable end play of the connecting rod on the wrist pin or of the wrist pin in the piston when the pin is made fast to the connecting rod. One purpose of the construction is to allow the connecting rod sufficient room to move axially of the wrist pin without hitting an obstruction limiting its movement. The resulting construction, however, allows the end of connecting rod to move axially of the wrist pin to such an extent that wear is aggravated, the movements being so violent that very objectionable knocking at the wrist pin and slapping of the piston is often produced. The resulting wear on the wrist pin and other parts makes it necessary frequently to repair the engine, thus involving considerable expense and loss of use of the engine while being repaired.

When repairing an engine of the type employing a wrist pin to couple the piston and connecting rod, it is necessary to almost completely dismantle the engine and perform laborious operations in order to remedy the effects of wear and other difficulties mentioned above.

Objects of the present invention are to overcome the above difficulties; to provide an internal combustion engine of light weight, low cost and simple construction adapted to wear uniformly and to operate smoothly without impulsive or other objectionable vibrations; to provide simple means whereby the coupling between the piston and connecting rod may be conveniently assembled, disassembled, repaired or adjusted; and generally to improve the construction and operation of apparatus of the kind referred to.

In accordance with one aspect of the present invention, I provide an internal combustion engine having a hollow piston coupled with the connecting rod of the engine by a universal joint. The connecting rod has a ball shaped termination journalled in a spherical socket bearing housed within the hollow part of the piston. The walls of the bearing are preferably thin and are connected with the piston by a plurality of rigid members. These members are preferably symmetrically disposed in relation to the bearing and extend radially therefrom along radii of the ball and the spherical socket, thus forming direct connections from the ball to the piston.

The bearing preferably consists of a cylindrical portion coaxial with the piston and a hemispherical portion closing one end of the cylindrical portion. A lining consisting of bearing material may be provided for the hemispherical portion, while a bushing in the cylindrical portion is provided with a spherical bearing surface supplemental to that of the hemispherical bearing member. A lock bushing adjacent to the bearing bushing holds the bearing bushing in fixed position, a lock washer being preferably provided between the two bushings. In order to facilitate the assembly and adjustment of the socket bearing elements, they are constructed in divisions or sections defined by an axial plane. This form of construction makes it possible to assemble the bushings and lock washer without difficulty between the ball termination of the connecting rod and the other end thereof, the ball being of greater diameter than the hole through the assembled bushings and washer.

These and other objects and features of the invention will be understood more clearly in view of the following description and accompanying drawing, in which:

Fig. 1 is a sectional elevation of a portion of an internal combustion engine;

Fig. 2 is a section of the engine taken on line 2—2 of Fig. 1;

Fig. 3 is a plan of a bearing bushing;

Fig. 4 is a section taken on line 4—4 of Fig. 3;

Fig. 5 is a plan of a lock washer;

Fig. 6 is a section taken on line 6—6 of Fig. 5;

Fig. 7 is a plan of a locking bushing; and

Fig. 8 is a section taken on line 8—8 of Fig. 7.

Referring to the drawings, the cylinder 10 of an internal combustion engine, or the like, contains the axially reciprocating cylindrical piston 11, coupled with connecting rod 12 on crank shaft 13.

The socket bearing member 14, housed within the hollow piston 11 contains the spherical socket 15, 16 within which is journalled the ball termination 17 of connecting rod 12. The walls of bearing 14 are preferably relatively thin and are connected with the piston by a plurality of symmetrically disposed rigid members 18, 19 extending from socket 14 along radii of ball 17 and socket 14.

It will be noted that member 18 forms a direct connection from the center of the head of the piston to ball 17 along the radius thereof, thus transmitting the force of an explosion above the piston or the force necessary to produce the desired compression in the most effective manner while employing only a minimum weight of material in the piston. Socket 14, Fig. 1, preferably has a cylindrical lower portion and a hemispherical portion closing the upper end of the cylindrical portion.

A hemispherical bearing member 20, of bearing material such as Babbitt metal or other suitable material, lining the hemispherical portion of socket 14, is provided with a central pilot boss 21 fitting within a pilot recess of corresponding shape on the axis of bearing member 14. Boss 21 retains bearing element 20 against displacement from a central position in socket 14. Bushing 22 of suitable bearing material lining a portion of socket 14, is provided with a spherical bearing surface 16, Fig. 4, supplemental to the bearing surface of element 20, that is, forming a continuation of the same spherical surface as that of element 20. Bushing 22 is preferably provided with threads at its periphery and is screwed into corresponding threads in the cylindrical portion of socket 14, so that the bushing may be adjusted axially in relation to element 20 to hold ball 17 in its proper position in socket 14 and to take up any free motion resulting from wear.

It will be noted that ball 17 is integral with connecting rod 12, while the opening in bushing 22 through which the rod passes is smaller than the largest cross section of ball 17. In order to permit of ready assembly of the bushing with the piston and other parts of the engine, bushing 22 is made in two divisions, the seam therebetween being defined by a radial plane as indicated in Fig. 3.

A plurality of spaced recesses 24 are provided in one radial face of bushing 22 to be engaged by a wrench or other tool for rotating the bushing in socket 14 to adjust its axial position.

Lock bushing 25 screwed into the threaded cylindrical portion of socket 14 is rotated by a wrench or other suitable tool, not shown, by engaging with spaced recesses 26. Bushing 25 may lock bushing 22 in any desired position by being screwed in such a direction as to apply suitable frictional force to hold bushing 22 from turning.

Spring lock washer 27 is preferably provided between bushings 22 and 25. It will be noted that bushing 25 and washer 27 are both divided similarly to and for the same purposes as bushing 22. Each section of washer 27 is provided with an ear 28 extending radially from the periphery of the washer, preferably at a point substantially midway between the ends of the section to pilot the washer and prevent its rotation, by fitting within a slot 29 of corresponding shape, as shown in Fig. 2, the slot extending axially in the cylindrical portion of socket 14. Each section of washer 27 is provided with upturned ends or is otherwise suitably formed so that it may be compressed between bushings 22 and 25 and exert suitable locking force to insure against loosening of the bushings by vibration.

A plurality of ducts 30 for a lubricating medium, such as oil, are spaced from the axis of the piston and lead through socket 14 from the side remote from connecting rod 12. Oil or other lubricant splashed or thrown into the upper hollow portion of piston 11 passes through ducts 30 and supplies the necessary lubrication between ball 17 and bearing elements 20 and 22.

Owing to the fact that gas suddenly admitted to cylinder 10 or exhausted therefrom or exploded in the cylinder seldom acts upon the piston in a perfectly symmetrical manner, there is usually produced a resultant rotational force tending automatically to rotate the piston in a progressive manner with reference to rod 12, so that the portions of cylinder 10 and piston 11 between which sliding takes place are continually changing with reference to each other and are thus subjected to uniform wear, while the distribution of the lubricating medium is equalized. This advantageous result may be contrasted with the objectionable situation frequently occurring in practice where the piston when coupled to the rod by a wrist pin may get comparatively dry on a side due to the absence of mechanism whereby the distribution of oil is equalized.

It will be noted that rod 12 as it approaches ball 17 has a substantially uniform diameter while the hole 31 through which the rod passes has the shape of the frustum of a cone. This arrangement and design permits of providing a maximum area for bearing surface 16 contacting with ball 17, while allowing of adequate cross sectional area of rod 12 in the region adjacent to the ball so that the parts have suitable strength to withstand the strains to which the rod is subjected when in use, while the weight of the parts is reduced to a minimum and the alternating movements of the parts produce the least vibration and strain.

It will be seen that the form of construction described lends itself to easy manufacture with a relatively small number of operations. By making the cylindrical portion of socket 14 of substantially the same diameter as the hemispherical portion, only simple boring and threading operations are required. The other elements 20, 22 and 25 may be produced by very simple screw machine operations, so that the cost of manufacturing an engine of this type may be reduced to a minimum.

The arrangement of ball 17 and the bearing parts therefor is such that the ball is self-centering, that is, the ball is automatically forced into a central position in piston 11 by properly adjusting bushing 22. In repairing or adjusting the coupling between piston 11 and rod 12, bushing 22 may be adjusted to provide the necessary tightness of fit between ball 17 and its bearings without requiring the engine to be completely dismantled. Lock washer 27 and lock bushing 25 are similarly adapted to be assembled or adjusted in relation to the other parts with a minimum amount of complication.

I claim:

1. In a piston, a connecting rod bearing comprising an interiorly-threaded cylindrical socket having a spherical bearing surface at one end thereof, a multi-section bearing bushing threaded into said socket and having a spherical bearing surface supplemental to said first mentioned bearing surface, a multi-section lock bushing threaded into said socket adjacent said bearing bushing, a multi-section spring lock washer between said bushings, each of said washer sections having a compressible portion therein and a peripheral ear, and axial slots in the interior wall of said socket adapted to receive said ears.

2. In a piston, a connecting rod bearing comprising an interiorly-threaded cylindrical socket having a spherical bearing surface at one end thereof, a multi-section bearing bushing threaded into said socket and having a spherical bearing surface supplemental to said first mentioned bearing surface, a multi-section lock bushing threaded into said socket adjacent said bearing bushing, a multi-section spring lock washer between said bushings, each of said washer sections having upturned ends and a peripheral ear midway between said ends, and axial slots in the interior wall of said socket adapted to receive said ears for holding said washer and bushings from rotation.

In witness whereof, I hereunto subscribe my name this 6th day of April, 1926.

ALLAN E. REID.